United States Patent
Pickeral

[11] Patent Number: 5,332,066
[45] Date of Patent: Jul. 26, 1994

[54] BOAT TRAILER REST

[76] Inventor: George R. Pickeral, 25 Jefferson Dr., White Plains, Md. 20695

[21] Appl. No.: 60,835

[22] Filed: May 14, 1993

[51] Int. Cl.⁵ ............................................. B60T 3/00
[52] U.S. Cl. ........................................ 188/32; 280/475; 410/30; 248/346.1
[58] Field of Search ............... 188/32, 4 R; 280/475, 280/763.1, 402, 79.4, 164.1, 166, 163; 410/30, 49, 50; 248/346.1, 188.6, 352

[56]  References Cited

U.S. PATENT DOCUMENTS

| | | | |
|---|---|---|---|
| 1,069,141 | 8/1913 | Jones | 248/346.1 |
| 1,159,571 | 11/1915 | Clark | 248/346.1 |
| 1,374,029 | 4/1921 | Prickett | 248/346.1 X |
| 1,554,327 | 9/1925 | Boberg | 188/32 |
| 1,562,817 | 11/1925 | Wismer | 248/346.1 X |
| 1,746,902 | 2/1930 | Persons | 248/346.1 X |
| 2,844,909 | 7/1958 | Perchinsky | 45/137 |
| 2,915,850 | 12/1959 | Goodfellow | 248/346.1 |
| 2,931,463 | 4/1960 | Stansbury | 188/32 |
| 3,989,276 | 11/1976 | Hamerl | 280/475 X |
| 3,997,191 | 12/1976 | Morgan | 280/475 X |
| 5,046,587 | 9/1991 | Jones | 188/32 |

FOREIGN PATENT DOCUMENTS 0013087 10/1896 Switzerland ............... 248/346.1

Primary Examiner—Robert J. Oberleitner
Assistant Examiner—Peter M. Poon
Attorney, Agent, or Firm—John K. Donaghy

[57]  ABSTRACT

A boat trailer rest comprising a base having a pair of major axis between opposed diagonal corners; walls extending upwardly from the base and terminating in a top; the top having major axis between opposed diagonal corners; a cradle in the top having a major axis coincident with one of the pair of major axis and a minor axis coincident with the other of the pair of major axis; and the cradle for supporting a jack wheel of the trailer substantially above the base.

8 Claims, 1 Drawing Sheet

BOAT TRAILER REST

BACKGROUND OF THE INVENTION

1. Field of the Invention

This invention pertains to a rest for a wheel and particularly to a rest for the wheel of a boat trailer jack.

2. Background of the Prior Art

The prior art shows chocks for caster wheels and trailer tongue wheels.

U.S. Pat. No. 2,844,909 discloses a caster-receiving support for machinery. U.S. Pat. No. 2,931,463 shows a wheel chock for the hitch wheel of a trailer. U.S. Pat. No. 5,046,587 discloses a wheel chock having peripheral ramps over which travel the wheel of a trailer hitch.

SUMMARY OF THE INVENTION

In the past, boat owners employed cement cinder blocks to support the jack wheel at an elevation to permit drainage of water through the rear drain hole in the transom of a boat. These cinder blocks are cumbersome to work with and often break resulting in damage to the wheel, jack and/or trailer tongue.

There is a need for inexpensive rest for the jack wheel of a trailer hitch which is sturdy and effective to support the jack wheel in an elevated position whereby water will drain out of a boat.

One object of this invention is to provide a rest for a trailer jack wheel which will support the trailer hitch at an elevation whereby water will drain from a boat supported on the trailer.

It is another object of this invention to provide a boat trailer jack wheel rest which has a generally flat base with opposed walls extending upwardly from the base to a top peripheral wall and a cradle between the top peripheral wall for supporting a trailer jack wheel at an elevation to provide for drainage of water through the transom drainage through hole.

Another object of this invention is to provide a trailer tongue wheel support which has opposed flanges on the base and hand holes in opposed walls parallel to the flanges whereby the rest may be lifted and the flanges placed in tracks on a rest support bracket attached to the trailer hitch for transportation with the trailer.

Yet another object of this invention is to provide a trailer hitch rest having a wheel support cradle a distance substantially above the base of the rest whereby the trailer hitch is at an angle greater than the horizontal whereby a boat supported on the trailer will have its floor sloping downwardly toward the stern to allow for drainage of water through the transom through hole.

Still another object of this invention is to provide a trailer hitch rest having a wheel support cradle substantially above the base and oriented diagonally of the rest between opposed corners of the rest such that the cradle and opposed corners are aligned on an axis coincident with the longitudinal axis of the trailer hitch whereby the weight of the trailer hitch is concentrated diagonally between opposed corners of the base of the rest.

These and other objects of the invention will become apparent to those skilled in the art to which the invention pertains from a reading of the following specification when taken in light of the annexed drawings.

DETAILED DESCRIPTION OF THE PREFERRED EMBODIMENT OF THE INVENTION

Figure 1:
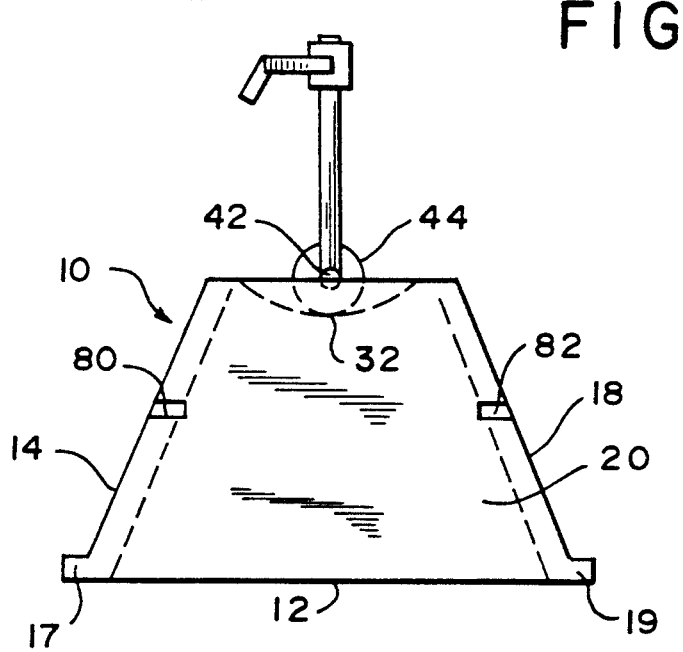
FIG. 1 is a cut-away side view of the trailer hitch rest showing a trailer jack and wheel resting in the cradle, hand holds for lifting the rest and opposed flanges to be received in a cage on the trailer tongue.

Referring now in more detail to the drawings, FIG. 1 shows a trailer hitch jack rest 10 having a generally square flat base 12 and side walls 14-20 extending upwardly from the base in a slightly inclined angle. The walls 14-20 terminate in a top wall 22 having edges 24-30. The top wall 22 is approximately 4 inches smaller than the base 12 and supports a cradle 32 between opposed corners 34 and 36 of the top and opposed corners 38, 40 of the base. The base 12 has opposed flange lips 17 and 19 extending the widths of opposed walls 14 and 18. A keeper 21 is provided in wall 18.

It will be seen that the cradle 32 is oriented diagonally between the opposed corners 34, 36 and 38, 40 whereby the weight of the trailer is concentrated on the cradle between the opposed corners of the top and the opposed corners of the base. This orientation provides for greater stability of the rest when it is supporting a trailer hitch.

It will be understood that the major axis of the cradle is in a plane coincident with the longitudinal axis 39 of the rest between base corner 38 and 40. This orientation of the cradle necessitates that the axle 42 of the jack wheel 44 is in a line 46 coincident with the axis 50 between opposed corners 39 and 41.

Figure 3:
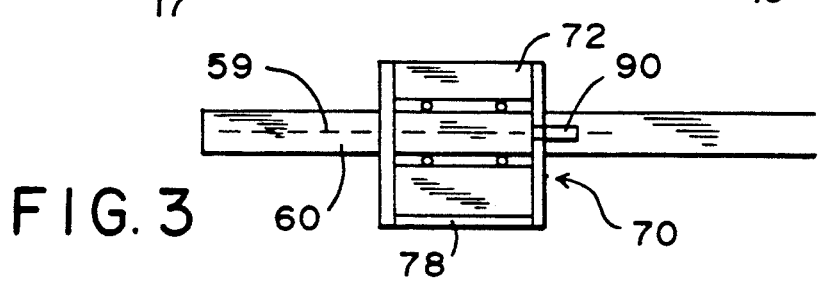
FIG. 3 is a side view of a cage attached on a trailer tongue and having u-shaped flanges for receiving the opposed flanges on the base whereby the rest may be transported with the trailer.

The orientation of the cradle 32 in this manner assures that its major axis 59 is in line with the major axis of trailer tongue 60, FIG. 3. This orientation is important so that the weight of the trailer is concentrated between opposed corner 34, 36, 38 and 40. This lends stability to the rest and prevents tipping of the rest which would occur if the weight of the trailer was concentrated centrally between opposed side walls 14, 18 or 16, 20.

Figure 2:
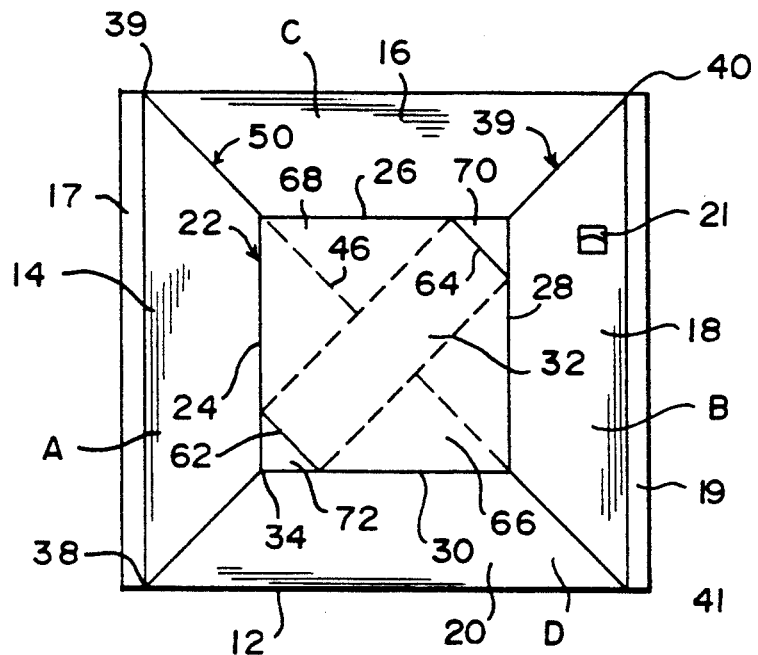
FIG. 2 is a top view of the trailer hitch rest showing a base, a top, a cradle in the top aligned diagonally between opposed corners of the base and top.

It will be seen in FIG. 2 that the rest 10 is divided into four major right triangles A and B having a common hypotenuse 50 and C and D having a common hypotenuse 39 and that the cradle 32 intersects the hypotenuse 50 and lies coincident with the hypotenuse 39.

The length of the cradle is substantially greater than the width, the latter being approximately the width of the trailer jack wheel. It is to be understood that the jack wheel is confined to the cradle and moves only in the longitudinal extent of the cradle having its major axis corresponding to the major axis of the rest between opposed corners of the base and top.

It will be understood that the cradle 32 is molded integral with the top 22 of the rest 10 and that flat webs 66 and 68, 70 and 72, extending from the cradle 32 to the top edges 24-30 form a closed top about the top edges 24-30. A weep hole (not shown) may be placed in the cradle for water drainage.

Figure 4:
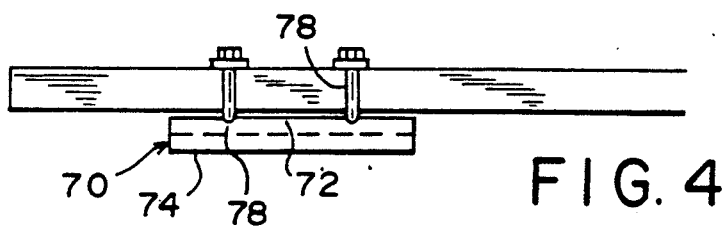
FIG. 4 is a top view of the cage with fastenings to secure the cage to a trailer tongue.

The trailer tongue 60, FIGS. 3 and 4, supports a cage 70 comprising a single sheet of material having a back wall 72 and opposed u-shaped flanges 74 and 76. Bolts/nuts 78 secure the cage 70 to the tongue 60.

It is desirable to carry the rest so as to support the trailer hitch at remote locations.

To accommodate this, the cage 70 is provided. When the trailer tongue is secured to the vehicle hitch, the jack is elevated by known means and the rest, is grasped and lifted by hand holds 80, 82 in opposed walls 14, 18. The flange tips 17 and 19 are slid into the u-shaped flanges 74, 76. The edge 12 of the base 10 rests on a ledge 78 on the plate 72. A hasp 90 on the plate 72 cooperates with the keeper 21 on the wall 18 whereby the rest 10 may be locked or secured to the trailer tongue 60.

It is contemplated that the rest 10 may be a one piece article molded from durable plastic such as fiberglass.

While the invention has been described with regard to a preferred embodiment thereof, it will be appreciated by those skilled in the art to which the invention pertains that numerous changes may be made to enhance the usefulness of the invention without departing from the support and scope thereof.

What I claim is:

1. A boat trailer rest comprising:
   a base having a pair of major axes between opposed diagonal corners;
   walls extending upwardly from the base and terminating in a top;
   said top having a pair of major axes between opposed diagonal corners;
   a cradle in the top extending diagonally along a line coincident with one of said major axes in the top and having longitudinal sides extending perpendicularly of said other of said major axes in the top; and
   a trailer jack wheel supported on the cradle substantially above the base near the top and in alignment with said coincident line whereby the weight of the trailer jack wheel is concentrated on the cradle along said line coincident with said major axis.

2. A boat trailer rest according to claim 1, wherein:
   webs extend from the cradle to the walls to provide a closed top.

3. A boat trailer rest according to claim 1, and
   said cradle having a width substantially equal to the width of the jack wheel.

4. In combination with a boat trailer having a trailer tongue, jack wheel and bracket means on the trailer tongue, a boat trailer rest comprising:
   a base having a generally flat bottom;
   walls extending upwardly from the base and terminating in a top, said top having a pair of major axes between opposed diagonal corners thereof;
   said walls having a pair of opposed flange lips adjacent to said base;
   a cradle formed in the top, said cradle for supporting the jack wheel and trailer tongue substantially above the base near the top whereby the weight of the jack wheel and trailer tongue is concentrated along one of said major axes; and
   said flange lips cooperating with said bracket means whereby the rest can be supported on and transported with the trailer tongue.

5. A boat trailer rest according to claim 4, wherein:
   said means bracket is a cage attached to the trailer tongue and having u-shaped flanges to receive said flange lips whereby the rest is secured to said cage on the trailer tongue.

6. A boat trailer rest according to claim 5, and
   means to lock the rest to the cage.

7. A boat trailer rest according to claim 4, and
   said cradle having a length greater than the width and said length extending substantially between diagonally opposed corners of the top.

8. In combination with a boat trailer having a trailer tongue, jack wheel and bracket means on the trailer tongue, a boat trailer rest comprising:
   a base having a generally flat bottom;
   walls extending upwardly from the base and terminating in a top;
   said walls having a pair of opposed flange lips adjacent to said base;
   a cradle in the top having a major axis between opposed diagonal corners of the top and in alignment with a major axis of the trailer tongue, said cradle for supporting the jack wheel substantially above the base near the top whereby the weight of the jack wheel and trailer tongue is concentrated along one of said major axis;
   said flange lips cooperating with said bracket means whereby the base can be supported on and transported with the trailer tongue;
   said bracket means is a cage attached to the trailer tongue and having u-shaped flanges to receive said flange lips whereby the rest is secured to said cage on the trailer tongue;
   means to lock the rest to the cage; and
   said means is a hasp and keeper.

* * * * *